(No Model.)

G. H. SAWYER.
CORN KNIFE AND SHIELD.

No. 328,344. Patented Oct. 13, 1885.

Witnesses
W. M. Rheem
R. W. Bishop

Inventor
George H. Sawyer
By his Attorneys
R. S. & A. P. Lacey

UNITED STATES PATENT OFFICE.

GEORGE H. SAWYER, OF LAMOILLE, ILLINOIS.

CORN KNIFE AND SHIELD.

SPECIFICATION forming part of Letters Patent No. 328,344, dated October 13, 1885.

Application filed July 28, 1885. Serial No. 172,887. (No model.)

*To all whom it may concern:*

Be it known that I, GEORGE H. SAWYER, a citizen of the United States, residing at Lamoille, in the county of Bureau and State of Illinois, have invented certain new and useful Improvements in Corn Knives and Shields; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention aims to provide an attachment for cultivators, by the use of which in the cultivation of corn all weeds which may be growing in with the corn will be cut down and thrown to the center of the furrow, where they readily wilt and die.

To that end it consists in the construction, combination, and arrangement of the several parts, as hereinafter fully described, and pointed out in the claim.

Figure 1:
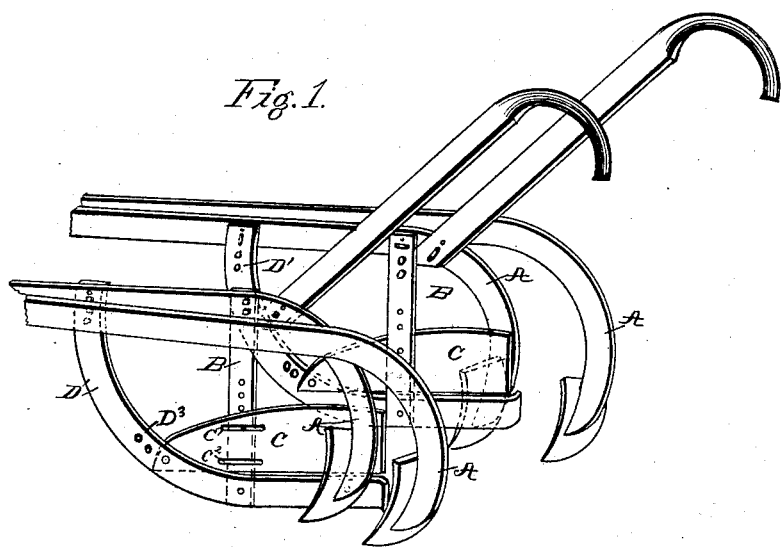
Figure 2:
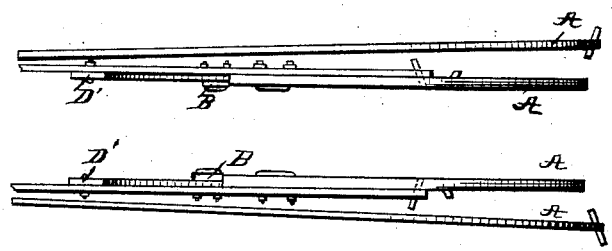
Figure 3:
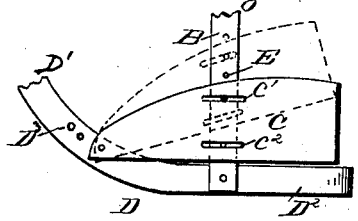

In the drawings, Figure 1 is a perspective view of a portion of a cultivator having my improvements attached. Fig. 2 is a plan view of the same; and Fig. 3 is a detail view of my attachment, the ends of the portions by which it is secured to the cultivator being broken away.

A designates the beams of an ordinary cultivator.

My attachment consists of the standard B, the shield C, and the knife D. The standard is bolted at its upper end to the cultivator-beam. Its lower end is bolted to the runner portion of the knife D. It is provided with a series of bolt-holes, E, the purpose of which will presently appear.

The knife D is composed of the upwardly-bent portion D' and the rear horizontal portion, $D^2$. The portion $D^2$ runs along or slightly below the surface of the ground. It extends back of, and its ends curve around behind, the cultivator-shovels, as shown. The front upwardly-bent portion, D', has its end bolted to the cultivator-beam, as shown. This portion D' has its front edge sharpened, and cuts the weeds away from the corn as the cultivator is drawn along.

The shield C is triangular in shape, and is pivoted at its front corner to the knife D. It is provided with two slots, C' $C^2$, which allow of the adjustment of the shield. (Indicated in dotted lines, Fig. 3.) By passing bolts through the slots C' $C^2$ and through the bolt-holes E the shield may be readily secured at any desired angle.

By setting the shields at more or less of an angle it will be seen that more or less space is left open between the shield and the lower portion of the knife, and consequently a stream of dirt may be allowed to constantly flow onto the corn where so desired.

My device is intended to run close to the corn, and will effectually cut away all weeds and vines growing with the same, a result which is very desirable.

The shield may be removed when it is desired.

The front end of the shield may be set higher on the shank of the runner or knife D. A series of holes, $D^3$, are provided for this purpose.

Having thus described my invention, what I claim, and desire to secure by Letters Patent, is—

The combination of the knife, the shield pivoted thereto, and the standard provided with a series of bolt-holes, whereby the shield may be adjusted to any desired angle, as and for the purposes specified.

In testimony whereof I affix my signature in presence of two witnesses.

GEORGE H. SAWYER.

Witnesses:
V. E. FRIZZELL,
CHAS. BUKONTZ.